US008616581B2

(12) United States Patent
Rihtar

(10) Patent No.: US 8,616,581 B2
(45) Date of Patent: Dec. 31, 2013

(54) MOUNTING ARRANGEMENT FOR PROTECTOR MOUNTED TO FUEL TANK

(75) Inventor: Jonathan A. Rihtar, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 107 days.

(21) Appl. No.: 13/079,228

(22) Filed: Apr. 4, 2011

(65) Prior Publication Data
US 2012/0248121 A1 Oct. 4, 2012

(51) Int. Cl.
B60P 3/22 (2006.01)
B60P 3/00 (2006.01)
B62D 25/20 (2006.01)

(52) U.S. Cl.
USPC ........... 280/832; 280/834; 220/562; 180/69.1

(58) Field of Classification Search
USPC ......... 220/562–564, 18, 23.91; 280/830–839; 180/69.1, 834, 832; 296/204; 211/192
See application file for complete search history.

(56) References Cited

U.S. PATENT DOCUMENTS

| | | | |
|---|---|---|---|
| 6,857,537 B2 * | 2/2005 | Yonezawa | 220/562 |
| 6,886,861 B2 * | 5/2005 | Marsala et al. | 280/834 |
| 7,045,708 B2 * | 5/2006 | Miura et al. | 174/507 |
| 7,497,290 B2 * | 3/2009 | Marsala et al. | 180/69.1 |
| 7,984,925 B2 * | 7/2011 | Levin et al. | 280/833 |
| 8,057,143 B2 * | 11/2011 | Adams | 410/104 |
| 2009/0309348 A1 | 12/2009 | Geurtz et al. | |
| 2011/0127761 A1 * | 6/2011 | Yoshizawa et al. | 280/834 |

FOREIGN PATENT DOCUMENTS

| | | |
|---|---|---|
| JP | 58-073456 | 5/1983 |
| JP | 61-064534 | 4/1986 |
| JP | 2000-016096 | 1/2000 |
| JP | 2005-138771 | 6/2005 |
| JP | 2008-025653 | 1/2008 |

* cited by examiner

Primary Examiner — Bryon Gehman
Assistant Examiner — Shawn Braden
(74) Attorney, Agent, or Firm — Rankin Hill & Clark LLP

(57) ABSTRACT

A mounting arrangement for mounting a vertical wall of a fuel tank protector to a vertical wall of a fuel tank includes a protector tab received in a fuel tank slot and a dog-house fastener received through a protector aperture and anchored in a fuel tank dog-house recess.

20 Claims, 3 Drawing Sheets

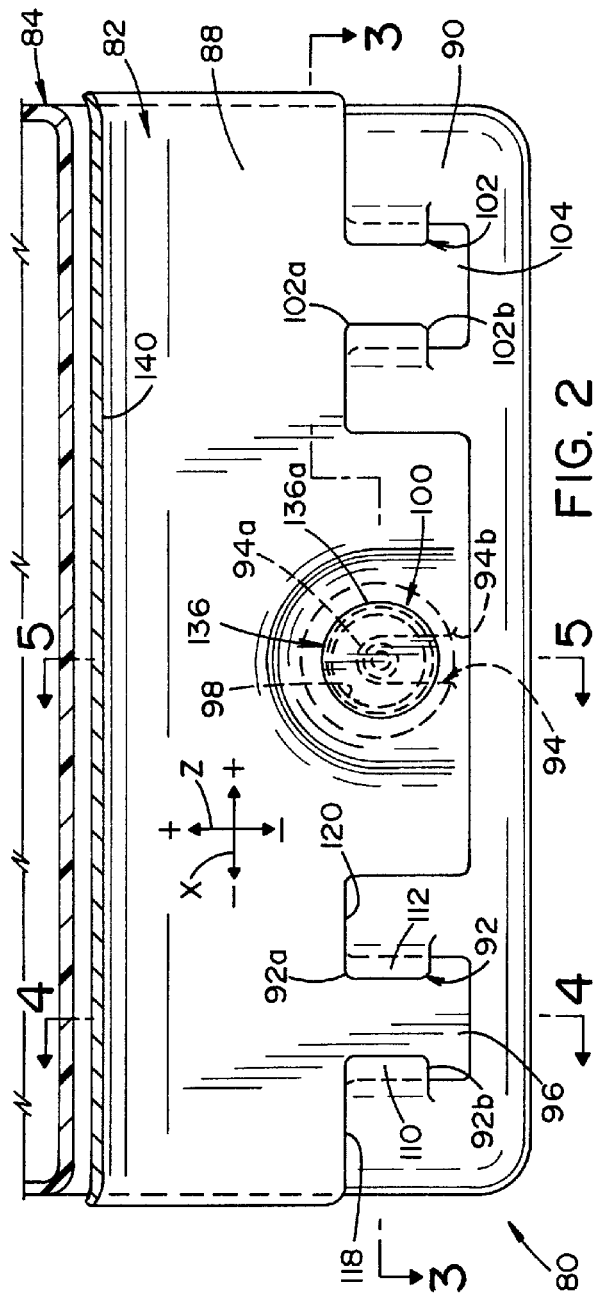
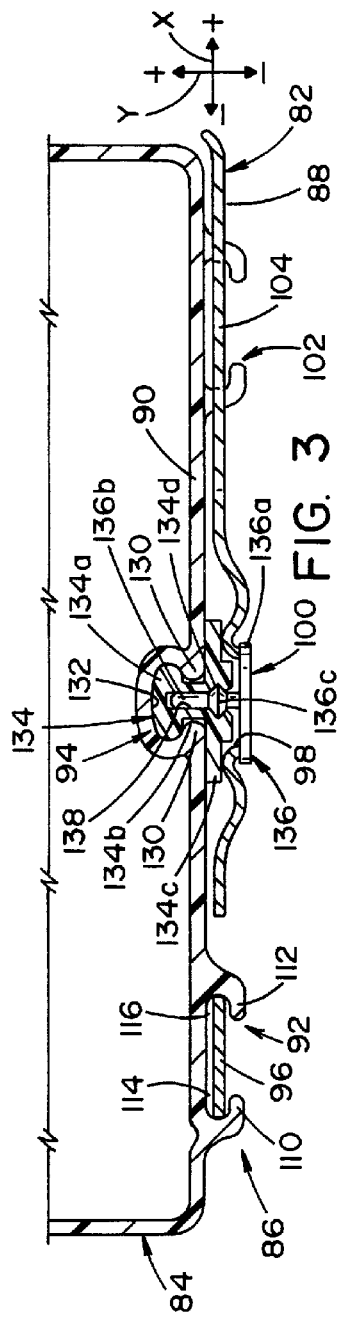
FIG. 2
FIG. 3

US 8,616,581 B2

MOUNTING ARRANGEMENT FOR PROTECTOR MOUNTED TO FUEL TANK

BACKGROUND

The present disclosure generally relates to fuel tank assemblies, and particularly relates to a mounting arrangement for a protector mounted to a fuel tank.

There are many known mounting arrangements for mounting a protector to a vehicle's fuel tank. In one such mounting arrangement, a fuel tank protector is mounted to the underside of a half-saddle fuel tank, which is itself mounted to the underside of a vehicle body by a plurality of fuel tank bands. In particular, a plurality of studs are attached to the underside of the fuel tank bands and inserted through mounting holes located on the fuel tank protector. Threaded members (e.g., nuts) are threaded onto each stud protruding through the protector to secure the protector to the fuel tank. This unfortunately requires a large number of parts and extra manufacturing processes (e.g., welding the studs to the bands).

In another known mounting arrangement, an underside-mounted fuel tank protector is sandwiched between the fuel tank and the bands supporting or attaching the fuel tank to the vehicle body. While this arrangement uses a reduced number of parts to mount the protector to the tank, the fuel tank bands may not press tightly against the bottom of the fuel tank, which can prevent the protector from being tightly sandwiched between the tank bands and the fuel tank. To compensate, the protector can be clipped to the fuel tank by a clip member. In particular, the fuel tank can have a stud attached to its underside surface in a center-tunnel area. A mounting hole located on the protector can receive the stud and the clip can be attached to the stud, thereby securing the protector to the fuel tank. With this additional measure, the mounting can be secured, but again extra parts and manufacturing processes are required.

In still another known mounting arrangement, the fuel tank protector covers one side (i.e., a center-tunnel area) of a half-saddle fuel tank and is secured thereto by clips. In particular, female clip features are integrally welded into a vertical wall of the fuel tank and male clip members passed through corresponding holes in the protector are received in the female clip features to mount the protector to the fuel tank. Undesirably, the welding of the female clip features into the fuel tank requires an additional manufacturing step that undesirably increases costs and manufacturing efficiencies. In a variation of this arrangement, the female clips can be slidably received in integrally molded slots of the fuel tank (e.g., oppositely facing slots) but this still requires a plurality of parts to be used for the mounting.

SUMMARY

According to one aspect, a mounting arrangement for mounting a vertical wall of a protector to a corresponding vertical wall of a fuel tank of a vehicle includes an open-ended slot integrally molded into the vertical wall of the fuel tank and a closed-end slot integrally molded into the vertical wall of the fuel tank. The open-ended slot has an open first end and an open second end. The closed-end slot has a closed first end and an open second end. A tab is integrally molded as part of the vertical wall of the protector. The tab is received in the open-ended slot for mounting the protector to the fuel tank. A protector aperture is defined in the vertical wall of the protector. The protector aperture is in registry with the closed-end slot with a fastener received through the protector aperture and the closed-end slot for further mounting the protector to the fuel tank.

According to another aspect, a fuel tank assembly having the protector mounted to a fuel tank includes a fuel tank wall having finger portions projecting therefrom to define an open-ended slot and a raised lip defining a closed-end slot. A protector wall has a tab portion received between the finger portions and the open-ended slot and a protector aperture aligned with the closed-end slot. A fastener is received through the protector aperture and into the closed-end slot.

According to a further aspect, a mounting arrangement for mounting a vertical wall of a fuel tank protector to a vertical wall of a fuel tank includes a protector tab received in a fuel tank slot and a dog-house fastener received through a protector aperture and anchored in a fuel tank dog-house recess.

BRIEF DESCRIPTION OF THE DRAWINGS

FIG. 2 is a side sectional view of the fuel tank assembly taken along the line 2-2 of FIG. 1 showing a vertical wall of the protector mounted to a corresponding vertical wall of the fuel tank.

FIG. 3 is a sectional view taken along the line 3-3 of FIG. 2.

DETAILED DESCRIPTION

Figure 1:
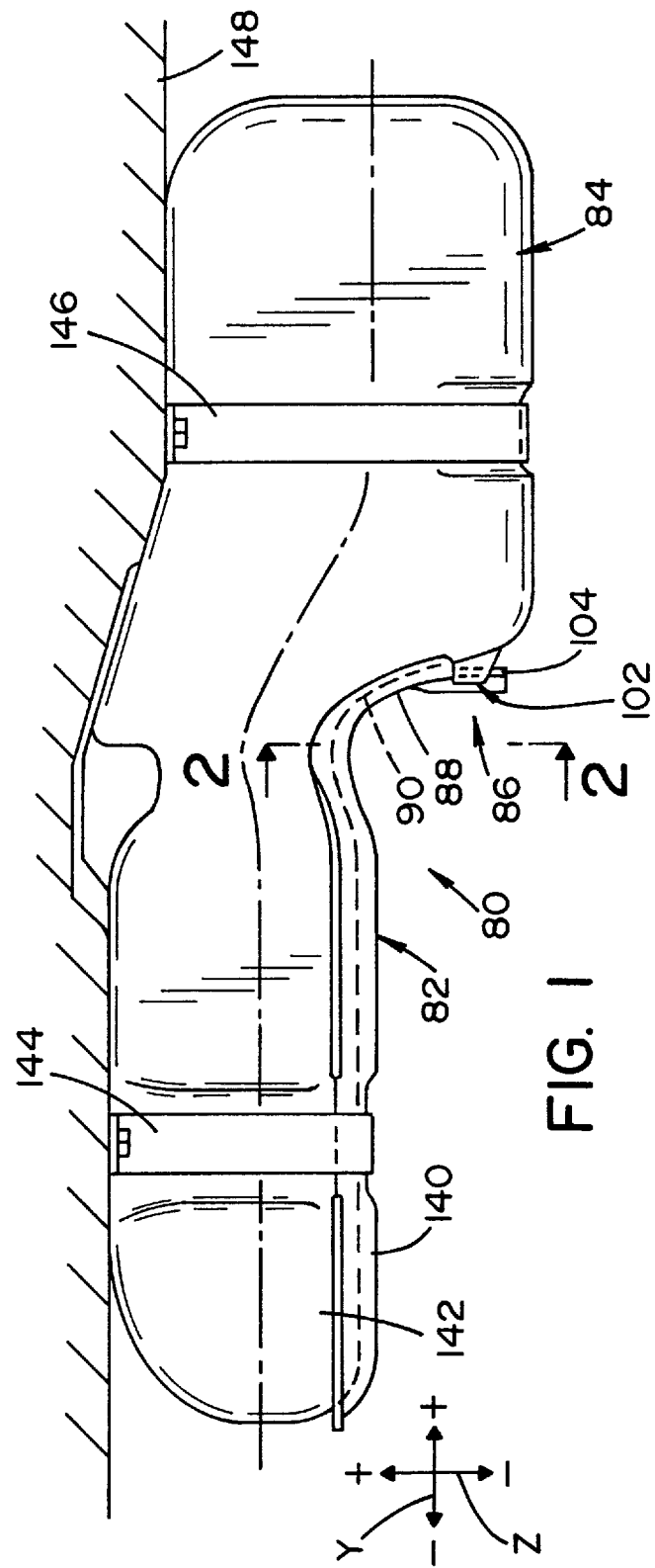
FIG. 1 is a front elevational view of a fuel tank assembly including a fuel tank secured to the underside of a vehicle and a protector mounted to the fuel tank.
Figure 4:
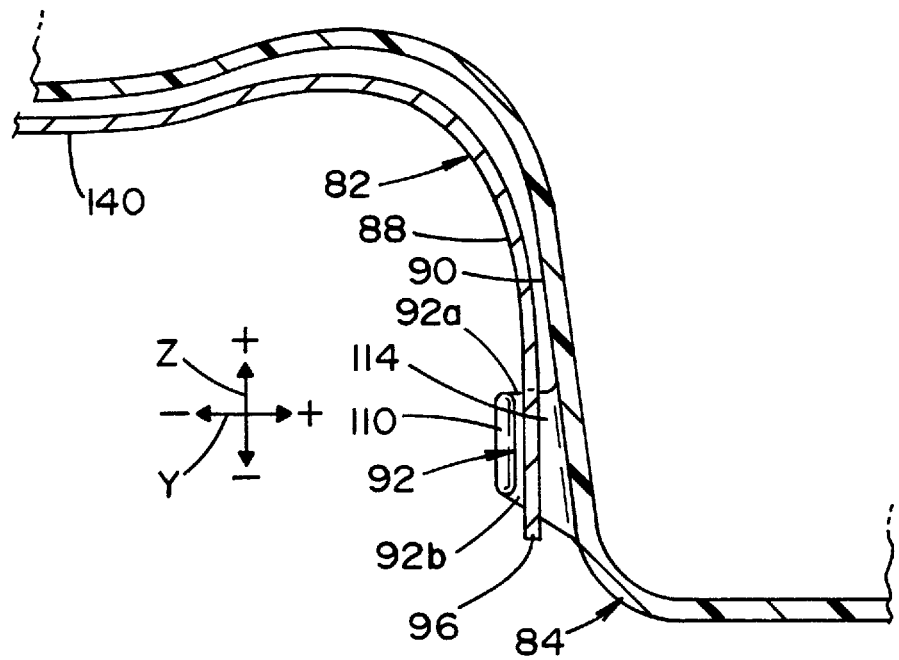
FIG. 4 is a sectional view taken along the line 4-4 of FIG. 2.

It is to be understood that the description and drawings herein are merely illustrative and that various modifications and changes can be made in the structures disclosed without departing from the scope of the present disclosure. All references to direction and position, unless otherwise indicated, refer to the orientation of the fuel tank and fuel tank protector illustrated in the drawings and should not be construed as limiting the claims appended hereto. Like numerals refer to like parts throughout the several views. As used herein, lateral directions (i.e., transverse across the vehicle) can be referred to collectively as the Y directions or specifically as the +Y or −Y directions. Likewise, the longitudinal directions (i.e., forward and rearward direction of vehicle travel) can be referred to collectively as the X directions or specifically as the +X and −X directions and the vertical directions (i.e., elevation) can be referred to collectively as the Z directions or specifically as the +Z or −Z directions.

With reference to FIGS. 1-5, a fuel tank assembly 80 is shown having a protector 82 mounted to a fuel tank 84. The fuel tank 80 can be formed of any suitable material, such as a suitable plastic for example. One exemplary suitable plastic for such fuel tanks is high density polyethylene. The protector 82 can also be formed of any material suitable for protecting the fuel tank 80. Exemplary materials include steel, aluminum, plastic, etc. In the illustrated embodiment, a mounting arrangement 86 is shown for mounting a vertical wall 88 of the protector 82 to a corresponding vertical wall 90 of the fuel tank 84 and thereby mounting the protector 82 to the fuel tank 84.

More particularly, the illustrated mounting arrangement 86 includes an open-ended slot 92 (i.e., a double open-end slot) integrally molded into the vertical wall 90 of the fuel tank 84.

The open-ended slot 92 has an open first end 92a and an open second end 92b. The mounting arrangement 86 further includes a closed-end slot 94 integrally molded into the vertical wall 90 of the fuel tank 84. The closed-end slot 94 has a closed first end 94a and an open second end 94b. A tab or tab portion 96 is integrally molded as part of the vertical wall 88 of the protector 82. The tab 96 is received in the open-ended slot 92 for mounting the protector 82 to the fuel tank 84. A protector aperture 98 is defined in the vertical wall 88 of the protector 82. The protector aperture 98 is in registry with the closed-end slot 94 and a fastener 100 is received through the protector aperture 98 and into the closed-end slot 94 for further mounting the protector 82 to the fuel tank 84.

In the illustrated embodiment, the open-ended slot 92 is a first open-ended slot and the tab is a first tab, with the mounting arrangement 86 further including a second open-ended slot 102 and a second tab 104. Like the first open-ended slot 92, the second open-ended slot 102 can be integrally molded into the vertical wall 90 of the fuel tank 84 and, like the first tab 96, the second tab 104 can be integrally molded as part of the vertical wall 88 of the protector 82. The second open-ended slot 102 can have an open first end 102a and an open second end 102b. As shown, the second tab 104 is received in the open-ended slot 102 for further mounting the protector 82 to the fuel tank 84. As shown in the illustrated embodiment, the first and second open-ended slots 92, 102 can flank the closed-end slot 94. As also shown, the open second end 94b of the closed-end slot 94 can face downwardly and the tabs 96, 104 can be inserted downwardly (i.e., in a same direction as the open end of the closed-end slot faces) into the respective open-ended slots 92, 102. Alternatively, though not illustrated, the open second end 94b of the closed-end slot 94 can face upwardly and the tabs 96, 104 can be inserted upwardly into the open-ended slots 92, 102.

As the open-ended slots 92, 102 can generally be the same, as can be the tabs 96, 104, only the open-ended slot 92 and the tab 96 will be described in further detail herein, though it is to be appreciated that all details concerning the open-ended slot 92 and the tab 96 are applicable to the open-ended slot 102 and the tab 104 unless indicated otherwise. To define the open-ended slot 92, the fuel tank wall 90 can have finger portions 110, 112 projecting therefrom. In particular, first finger portion 110 projects from the fuel tank vertical wall 90 defining a first finger gap 114 between the first finger portion 110 and the fuel tank vertical wall 90. Second finger portion 112 also projects from the fuel tank vertical wall 90. A second finger portion 112 defines a second finger gap 116 between the second finger portion 112 and the fuel tank vertical wall 90. As best shown in FIGS. 2 and 3, the first and second finger portions 110, 112 can point toward one another.

Specifically, the finger portions 110, 112 define the finger gaps 114, 116 between undersides of the finger portions 110, 112 and an outer side of the fuel tank wall 90. The tab 96 is received in the open-ended slot 92, and particularly in the finger gaps 114, 116 to prevent lifting movement of the protector wall 88 from the fuel tank wall 90. Cooperation between the tab 96 and the finger portions 110, 112 prevents relative movement between the protector 82 and the fuel tank 84 in a lateral direction (in the + or −Y directions defined between or parallel to an axis between doors of the vehicle) and a longitudinal direction (in a + or −X direction defined longitudinally along the vehicle). For example, as shown in FIG. 2, the finger portions 110, 112 prevent relative movement of the protector 82 in the longitudinal direction and, as best shown in FIG. 3, the overlap of the finger portions 110, 112 on the tab 96 prevents relative movement of the protector 82 in the lateral direction.

The tab 96 can be a portion of the vertical wall 88 defined by recesses 118, 120 of the vertical wall 88. In other words, the recesses 118, 120 are defined in the vertical wall 88 to thereby define the tab 96. The depth of the recesses 118, 120 controls the length of the tab 96, which also controls an amount the tab 96 can be inserted in the slot 92. Accordingly, by this arrangement, cooperation between the tab 96 and the finger portions 110, 112 can prevent vertical relative movement between the protector 82 and the fuel tank 84 in a first vertical direction (i.e., downward in FIG. 2 in the −Z direction). More particularly, the finger portions 110, 112 and the tab 96 are configured via the recesses 118, 120 to prevent further insertion of the tab 96 into the open-ended slot 92 beyond a predetermined location (i.e., the location shown in FIG. 2) which corresponds to a location where the protector aperture 98 is aligned or in registry with the closed-end slot 94 adjacent the closed-end 94b of the closed-end slot 94.

Figure 5:
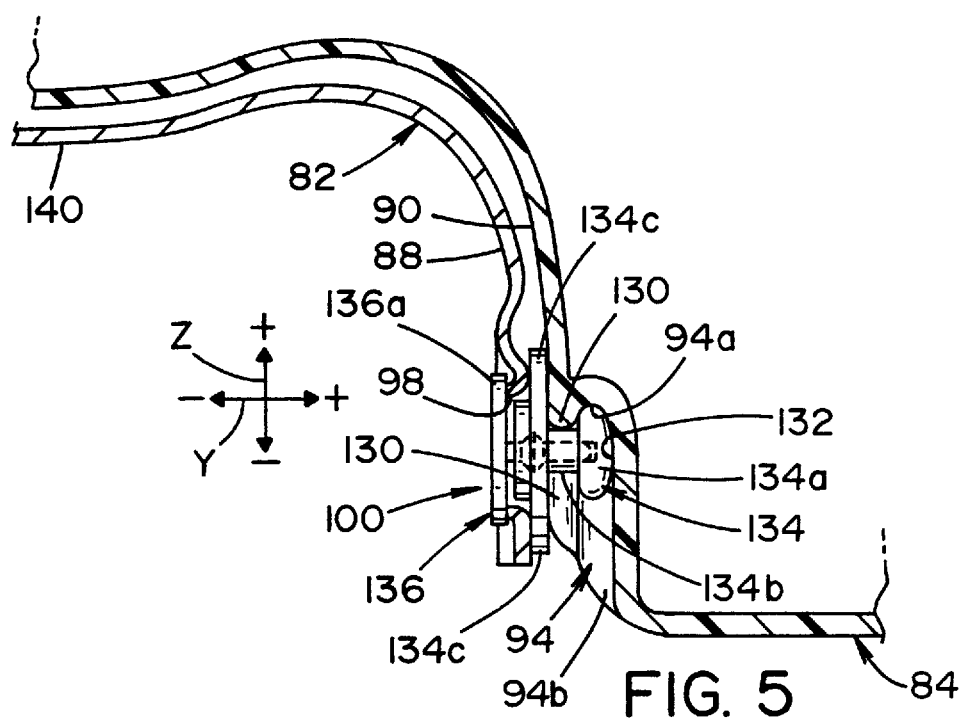
FIG. 5 is a sectional view taken along the line 5-5 of FIG. 2.

The closed-end slot 94 is defined by a raised lip 130 protruding from the vertical wall 90 of the fuel tank 84. As best shown in FIGS. 3 and 5, the raised lip 130 defines a dog-house recess between an underside of the clip and an underside of the vertical wall 88. The fastener 100 can include a female clip or dog-house member 134 and a male clip member 136. The female clip member 134 is received in the dog-house recess 132 defined by the raised lip 130. More particularly, the female clip member 134 has a dog-house portion 134a slidably received in the close-end slot 94. The dog-house portion 134a is particularly received in the dog-house recess 132 and thereby prevents the protector vertical wall 88 from lifting away from the fuel tank vertical wall 90. In particular, the female clip number 134 is slidably received through the open second end 94b of the close-end slot 94 and along the close-end slot 94 such that a clip aperture 138 defined by the female clip member 134 is in registry with the protector aperture 98 defined in the vertical wall 88 of the protector 82. More specifically, the female clip member includes a shaft portion 134b projecting from the dog-house portion 134a through the close-end slot 94 and a head portion 134c disposed in spaced relation on the shaft portion 134b from the dog-house portion 134a.

The male clip member 136, also referred to herein as a dog-house fastener, can be received through the protector aperture 98 and into the clip aperture 138 defined by the female clip member 134. More specifically, the male clip member 136 is received through the protector aperture 98 and anchored in the female clip member 134 (e.g., via a press fit). Specifically, the male clip member 136 can have a head portion 136a and a shaft portion 136b, wherein the shaft portion 136b is received through the protector aperture 98 and into the clip aperture 138. A radial protrusion 136c can be provided along the shaft portion 136b for receipt in a corresponding recess 134d defined in the flange portion 134c of the female clip member 134 to press-fit the male clip member 136 to the female clip member 134. Cooperation between the tab 96 and the finger portions 110, 112 limits movement of the protector 82 relative to the fuel tank 84 in the −Z, +Y, −Y, +X and −X directions and cooperation between the fastener 100, the protector aperture 98 and the raised lip 130 limits movement of the protector 82 relative to the fuel tank 84 in the +Z, +Y, −Y, +X and −X directions. Accordingly, the protector 82 cannot move in any direction relative to the fuel tank 84.

Advantageously, the mounting arrangement 86 allows the features 92, 94, 102 to be molded only into a bottom half of the fuel tank 84 or, alternatively, added only to the top half of the fuel tank 84 when the orientation is reversed. When the mounting arrangement 86 is used on fuel tank 84 in a half-saddle configuration (as shown in the illustrated embodiment), a horizontal portion 140 of the protector can be mounted to the corresponding portion 142 of the fuel tank 84 by one of the bands 144, 146 used to mount the fuel tank 84 to the vehicle body or structure 148. More particularly, as best shown in FIG. 1, the horizontal portion 140 of the protector 82 can be sandwich mounted to the portion 142 of the fuel tank 84 by the band 144. Such sandwich mounting is possible due to the mounting arrangement 86 preventing both Y and X movement. Advantageously, only a single male clip member and a single female clip member are used in the illustrated mounting arrangement 86 and no fuel tank welding or fuel tank band welding are required. Accordingly, reduced processing is required and the overall number of parts used for mounting (e.g., only a single male clip and a single female clip) is reduced. Further, the mounting arrangement 86 reduces complexity as compared to other mounting arrangements. These improvements result in lower costs and lower overall weight.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A mounting arrangement for mounting a vertical wall of a protector to a corresponding vertical wall of a fuel tank of a vehicle, comprising:
    an open-ended slot integrally molded into the vertical wall of the fuel tank, the open-ended slot having an open first end and an open second end;
    a closed-end slot integrally molded into the vertical wall of the fuel tank, the closed-end slot having a closed first end and an open second end;
    a tab integrally molded as part of the vertical wall of the protector, the tab received in the open-ended slot for mounting the protector to the fuel tank; and
    a protector aperture defined in the vertical wall of the protector, the protector aperture in registry with the closed-end slot with a fastener received through the protector aperture and the closed-end slot for further mounting the protector to the fuel tank.

2. The mounting arrangement of claim 1 wherein the open-ended slot is a first open-ended slot and the tab is a first tab, the mounting arrangement further including:
    a second open-ended slot integrally molded into the vertical wall of the fuel tank, the second open-ended slot having an open first end and an open second end;
    a second tab integrally molded as part of the vertical wall of the protector, the second tab received in the open-ended slot for further mounting the protector to the fuel tank.

3. The mounting arrangement of claim 2 wherein the first and second open-ended slots flank the closed-end slot.

4. The mounting arrangement of claim 1 wherein the open second end of the closed-end slot faces downwardly relative to a horizontal wall of the fuel tank and the tab is inserted downwardly into the open-ended slot in the same direction as the open second end of the closed-end slot faces.

5. The mounting arrangement of claim 1 wherein the fastener includes:
    a female clip member defining a clip aperture, the female clip member slidably received through the open second end of the closed-end slot and along the closed-end slot such that the clip aperture is in registry with the protector aperture defined in the vertical wall of the protector; and
    a male clip member having a head portion and a shaft portion protruding from the head portion, the shaft portion received through the protector aperture and into the clip aperture.

6. The mounting arrangement of claim 1 wherein the open-ended slot is defined by:
    a first finger portion projecting from the fuel tank vertical wall defining a first finger gap between the first finger portion and the fuel tank vertical wall; and
    a second finger portion projecting from the fuel tank vertical wall defining a second finger gap between the second finger portion and the fuel tank vertical wall, the first and second finger portions pointing toward one another.

7. The mounting arrangement of claim 6 wherein cooperation between the tab and the finger portions prevents relative movement between the protector and the fuel tank in a lateral direction and in a longitudinal direction.

8. The mounting arrangement of claim 7 wherein cooperation between the tab and the finger portions further prevents vertical relative movement between the protector and the fuel tank in a first vertical direction.

9. The mounting arrangement of claim 1 wherein the closed-end slot is defined by a lip protruding from the fuel tank vertical wall, the lip defining a dog-house recess between an underside of the lip and the fuel tank vertical wall.

10. The mounting arrangement of claim 9 wherein the fastener includes a female clip member having a dog-house portion slidably received in the closed-end slot, the dog-house portion received in the dog-house recess and thereby the protector vertical wall is prevented from lifting away from the fuel tank vertical wall.

11. The mounting arrangement of claim 10 wherein the female clip member further includes a shaft portion projecting from the dog-house portion through the closed-end slot and a head portion disposed in spaced relation on the shaft portion from the dog-house portion, the fastener further including a male clip member received through the protector aperture and snap-fit into the female clip member.

12. The mounting arrangement of claim 1 wherein recesses are defined in the protector vertical wall to define the tab.

13. A fuel tank assembly having a protector mounted to a fuel tank, comprising:
    a fuel tank wall having finger portions projecting therefrom to define a double open-ended slot and a raised lip defining a closed-end slot;
    a protector wall having a tab portion received between the finger portions in the open-ended slot and a protector aperture aligned with the closed-end slot; and
    a fastener received through the protector aperture and into the closed-end slot.

14. The fuel tank assembly of claim 13 wherein the finger portions define finger gaps between undersides of the finger portions and an outer side of the fuel tank wall, the tab portion received in the finger gaps to prevent lifting movement of the protector wall from the fuel tank wall.

15. The fuel tank assembly of claim 14 wherein the finger portions and the tab portion are configured to prevent insertion of the tab portion into the open-ended slot beyond a predetermined location which corresponds to a location where the protector aperture is aligned with the closed-end slot adjacent a closed end of the closed-end slot.

16. The fuel tank assembly of claim 13 wherein the tab portion is a portion of the protector vertical wall defined by recesses of the vertical wall.

17. The fuel tank assembly of claim 13 wherein the fastener includes:

a female dog-house member received in a dog-house recess defined by the raised lip; and a male clip member received through the protector aperture and into a clip aperture defined by the female dog-house member.

18. The fuel tank assembly of claim 13 wherein cooperation between the tab portion and the finger portions limits movement of the protector relative to the fuel tank in the −Z, +X, −X, +Y and −Y directions and cooperation between the fastener, protector aperture and the raised lip limits movement of the protector relative to the fuel tank in the +Z, +X, −X, +Y and −Y directions.

19. A mounting arrangement for mounting a vertical wall of a fuel tank protector to a vertical wall of a fuel tank, comprising:

a protector tab integrally molded as part of the vertical wall of the protector and received in a fuel tank slot; and a dog-house fastener received through a protector aperture and anchored in a fuel tank dog-house recess.

20. The mounting arrangement of claim 19 further including:

a second protector tab received in a second fuel tank slot, the protector tabs flanking the protector aperture.

* * * * *